United States Patent [19]
McInnis et al.

[11] 3,713,457
[45] Jan. 30, 1973

[54] COMBINATION ANTI-SIPHON AND SHUT-OFF PLASTIC VALVE

[76] Inventors: Andrew M. McInnis, 3601 Rancho Del Monica, Covina, Calif. 91722; Robert A. Nielsen, 1026 Cynthia Ave., Pasadena, Calif. 91107

[22] Filed: Dec. 28, 1970

[21] Appl. No.: 101,837

[52] U.S. Cl. ................. 137/218, 251/267, 251/368
[51] Int. Cl. ............................................. F16k 45/00
[58] Field of Search ...E03c/1/00; 137/218, 215, 216; 251/264, 266, 267, 270, 273, 368, 357

[56] References Cited

UNITED STATES PATENTS

| | | | |
|---|---|---|---|
| 2,089,848 | 8/1937 | Hoferle | 251/267 X |
| 2,133,804 | 10/1938 | Brooks | 137/218 |
| 3,104,090 | 9/1963 | Callahan, Jr. | 251/368 X |
| 3,416,556 | 12/1968 | Nelson | 137/218 |
| 3,454,032 | 7/1969 | Hinz et al. | 137/218 |
| 3,565,097 | 2/1971 | Costa et al. | 137/218 |

*Primary Examiner*—Alan Cohan
*Assistant Examiner*—David R. Matthews
*Attorney*—White, Haefliger & Bachand

[57] ABSTRACT

A valve of substantial plastic construction comprises:

a. a molded plastic chamber and an annular main seat therein, there being a chamber outlet, b. a stem projecting through the seat with clearance therefrom, the stem carried by the chamber at one side of the seat, c. an externally accessible handle operatively connected with the stem to rotate same, and d. a stopper having thread connection with the stem and operable to engage and disengage the seat at the opposite side thereof and in response to stem rotation, and e. the chamber having a liquid pressure inlet to communicate said pressure to the stopper for transmitting pressure loading to the seat when stem is rotated to engage the stopper against the seat, whereby the stopper will remain closed against the seat irrespective of liquid pressure or temperature change induced expansion and contraction of the housing.

3 Claims, 3 Drawing Figures

INVENTORS.
ANDREW M. McINNIS
ROBERT A. NIELSEN
BY White, Haefliger & Bachand
ATTORNEYS.

COMBINATION ANTI-SIPHON AND SHUT-OFF PLASTIC VALVE

BACKGROUND OF THE INVENTION

This invention relates generally to anti-siphoning, shut-off valves, as are usable for example in water sprinkler supply lines. More particularly, the invention concerns a valve of this type having molded plastic construction.

It would be of considerable advantage in certain applications, as for example in controlling water flow to garden or lawn sprinklers, to utilize a lightweight valve of all-plastic construction, such a valve being very economical of manufacture. However, such valves are subject to substantially greater expansion and contraction, due to temperature change and water pressure application, than all metal valves, such expansion and contraction producing serious leakage problems. Accordingly, valves of such construction have not been considered practical.

SUMMARY OF THE INVENTION

It is a major object of the invention to provide a valve suitable for all-plastic construction, and which will not leak due to such normal pressure and temperature changes as are encountered in water supply systems servicing lawn or garden equipment. It is another object of the invention to provide an anti-siphoning, shut-off valve of unusually advantageous and simple construction.

Basically, the valve comprises, in combination, a molded plastic body or chamber and an annular main seat therein, the chamber having an outlet; a stem projecting through the seat with clearance, and the stem carried by the chamber at one side of the seat; an externally accessible handle operatively connected with the stem to rotate same; and a stopper having thread connection with the stem and operable to engage and disengage the seat at the opposite side thereof and in response to stem rotation, the chamber having an inlet for liquid pressure applicable to the stopper for transmitting pressure loading directly to the seat when the stopper engages the seat, whereby the stopper will remain closed against the seat irrespective of changes in liquid pressure or temperature change induced expansion and contraction of the housing. As will appear, the stopper, stem and handle may thereby also consist of molded plastic material, and the main seat may consist of an elastomer.

Further, a vacuum breaker ring may typically extend about the stem at the side of the main seat opposite the stopper, the chamber defining an air inlet passage closed by the ring when the stopper disengages the main seat to pass pressurized liquid to the ring and the outlet. Also, the ring may have another position in which it seals off flow through the main seat, excepting that clearance is then provided between the stem and ring to pass air to the inlet side of the stopper in response to vacuum application to that inlet.

These and other objects and advantages of the invention, as well as the details of an illustrative embodiment, will be more fully understood from the following description and drawings, in which:

DRAWING DESCRIPTION

DETAILED DESCRIPTION

Figure 1:
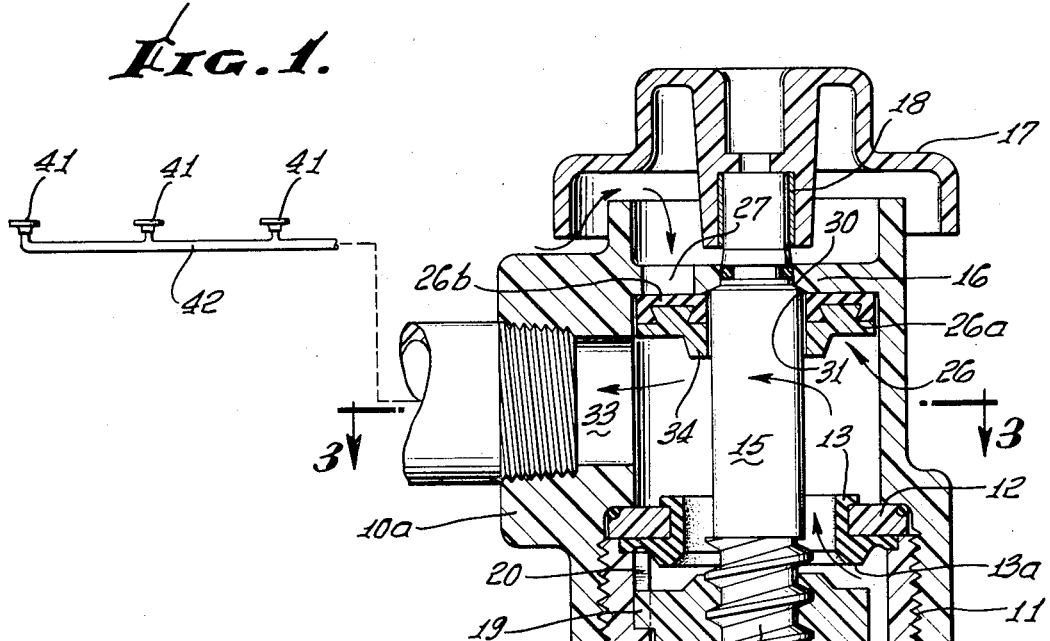
FIG. 1 is a vertical section taken through one form of valve incorporating the invention.

In the drawings a molded plastic valve body or chamber 10 includes a main secton 10a and an auxiliary tubular section 10b, the two sections having threaded interconnection at 11. A molded plastic annulus 12 retained between the sections carries a soft elastomer (rubber, for example) main seat 13 annularly engagable at 13a by a plug or stopper 14, which may also consist of molded plastic material. The stopper is carried by the threaded extent 15a of a central stem 15 projecting with clearance through the seat 13, and the stem is in turn carried by the flange 16 which is a part of the body section 10a, and at the side of the seat opposite the stopper. An externally accessible handle 17 is operatively connected with the stem, as at 18, to rotate the stem in order to effect stopper displacement toward and away from the seat. Note that the stopper and body section 10b have tongue and groove connection at 19 and 20 acting to block relative rotation of the stopper and body during such stopper displacement, while accomodating the latter.

The stem 15 and handle 17 may also consist of molded plastic material, and be interconnected as by bonding at 18. Accordingly, the valve as a whole may be considered to have light weight molded plastic construction especially well suited for lawn sprinkler control, and it also overcomes problems of leakage due to temperature change induced, or liquid pressure induced, expansion and contraction of the housing. Thus, inlet liquid pressure communicated via the inlet 21 to the stopper is transmitted by the latter to the seat 13 when the stopper is closed, whereby the stopper will remain closed against leakage despite such body expansion and contraction. In this regard inlet pressure loading is transmitted via the stem to the body upper portion when the stopper is open, via stem tapered shoulder 30 and body shoulder 31, but expansion of the chamber is not then a problem. When the valve stem is rotated to open the valve, the stopper 14 may be bodily displaced downwardly against annular stop shoulder 22, to limit turning of the handle in the opening direction.

Figure 2:
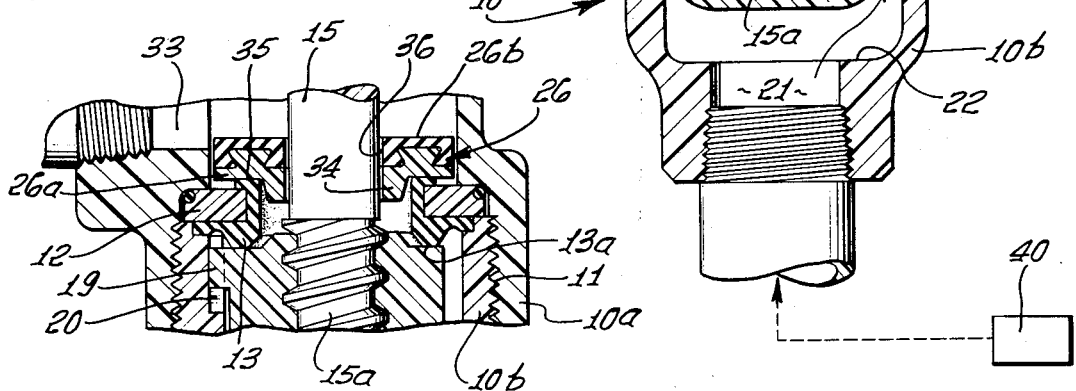
FIG. 2 is a fragmentary section showing the vacuum breaker ring in down position.
Figure 3:
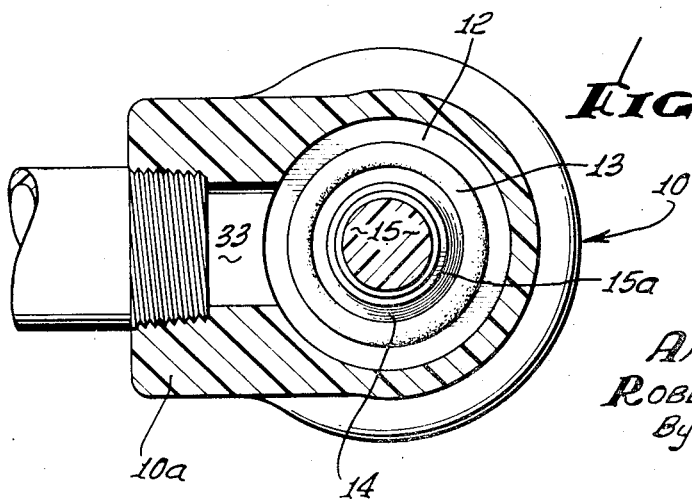
FIG. 3 is a horizontal section taken on lines 3—3 of FIG. 1.

A vacuum breaker ring 26 extends about the stem 15 at the side of the main seat opposite the stopper, to move between up and down positions as seen in FIGS. 1 and 2. In this regard, the chamber or body defines an air inlet passage 27 that is closed by the ring urged into up position by the liquid pressure passed by the valve in stopper open condition. Note that the ring may comprise a molded plastic part 26a and a soft rubber part 26b adapted to seat against the flange 16 to close passage 27.

The ring 26 has another, or down, position as seen in FIG. 2, and in which it seals off liquid flow through the annular gap between the main seat 13 and the stem in a reverse direction, i.e., from outlet 33 to inlet 21, as might otherwise be induced by inadvertent vacuum application to the inlet 21 when the stopper 14 is open. This protects against contamination of community water supply lines. At such time, the ring annular projection 34 interfits between the stem and main seat, as seen in FIG. 2, the ring having gravitated downwardly to engage and seal against the main seat at annular location 35. A slight clearance may be provided between the stem and ring at 36 to pass air to the inlet 21 in response to the vacuum application referred to, when there is no liquid flowing reversely into the body via the outlet 33. Accordingly, there is no inducement for lawn water backing up into the outlet 33. In this regard, water supply to the valve is indicated at 40, and sprinklers 41 are supplied from a pipe 42 connected with the valve.

It will be noted that the anti-siphon plug 26 gravitates into FIG. 2 position when the valve is closed. Also, plug 14 cannot turn and scuff the seat 13a.

I claim:

1. In a valve, the combination comprising
  a. a chamber and an annular elastomer, main seat therein, there being a chamber outlet,
  b. a stem projecting through the seat with clearance therefrom, the stem carried by the chamber at one side of the seat,
  c. an externally accessible handle operatively connected with the stem to rotate same,
  d. a stopper having connection with the stem and operable to engage and disengage the seat at the opposite side thereof and in response to stem rotation,
  e. the chamber having a liquid pressure inlet to communicate said pressure to the stopper for transmitting pressure loading to the seat when the stem is rotated to engage the stopper against the seat, whereby the stopper will remain closed against the seat irrespective of liquid pressure or temperature change induced expansion and contraction of the housing,
  f. a vacuum breaker ring extending closely about the stem to slide along smooth surface extent of the stem at the side of the main seat opposite the stopper, the chamber defining an air inlet passage closed by the ring when the stopper disengages the main seat to pass pressurized liquid to said ring and said outlet, and the ring having another position in which a ring boss projects between the stem and the seat to seal off flow through the main seat excepting that reduced clearance is then provided between the stem and ring proximate the seat to pass air to the inlet side of the stopper in response to vacuum application to said liquid outlet,
  g. the stopper and stem both consisting of plastic material, and
  h. the stem and stopper having rotary threaded interconnection at the side of the seat opposite the ring and there being a tongue and groove connection between the stopper and said chamber to block rotation of the stopper in response to stem rotation to displace the stopper toward and away from the main seat.

2. The combination of claim 1 wherein the stem consists of molded plastic material.

3. The combination of claim 2 wherein the handle consists of molded plastic material.

* * * * *